United States Patent
Dowd et al.

(10) Patent No.: US 11,645,334 B2
(45) Date of Patent: May 9, 2023

(54) TECHNIQUES FOR RENDERING A TABLE SPANNING MULTIPLE PAGES

(71) Applicant: EMC IP Holding Company LLC, Hopkinton, MA (US)

(72) Inventors: Ronan Dowd, Cork (IE); Robert Fitzgerald, Cork (IE); Micheal Walsh, Cork (IE)

(73) Assignee: EMC IP Holding Company LLC, Hopkinton, MA (US)

( * ) Notice: Subject to any disclaimer, the term of this patent is extended or adjusted under 35 U.S.C. 154(b) by 869 days.

(21) Appl. No.: 16/537,896

(22) Filed: Aug. 12, 2019

(65) Prior Publication Data

US 2021/0049208 A1 Feb. 18, 2021

(51) Int. Cl.
*G06F 16/901* (2019.01)
*G06F 3/06* (2006.01)
*G06F 16/957* (2019.01)

(52) U.S. Cl.
CPC ........ *G06F 16/9017* (2019.01); *G06F 3/0611* (2013.01); *G06F 3/0644* (2013.01); *G06F 3/0673* (2013.01); *G06F 16/9577* (2019.01)

(58) Field of Classification Search
CPC ............. G06F 16/9577; G06F 16/9017; G06F 3/0611; G06F 3/0673; G06F 3/0644
USPC ........................................................ 707/741
See application file for complete search history.

(56) References Cited

U.S. PATENT DOCUMENTS

| | | | |
|---|---|---|---|
| 2004/0194028 A1* | 9/2004 | O'Brien | G06F 40/103 715/251 |
| 2006/0005116 A1* | 1/2006 | Ferguson | G06F 40/103 715/252 |
| 2007/0127073 A1* | 6/2007 | Goel | G06K 15/02 358/1.18 |
| 2014/0046950 A1* | 2/2014 | Zelek | G06F 16/24557 707/E17.049 |

(Continued)

OTHER PUBLICATIONS

Microsoft PowerPoint, "I have a table in PowerPoint that doesn't fit on one page. How do I make the table 'roll' or continue on subsequent pages?" https://www.quora.com/I-have-a-table-in-PowerPoint-that-doesnt-fit-on-one-page-How-do-I-m, Sep. 2016.

(Continued)

*Primary Examiner* — Tony Mahmoudi
*Assistant Examiner* — Kamal K Dewan
(74) *Attorney, Agent, or Firm* — Muirhead and Saturnelli, LLC

(57) ABSTRACT

Techniques for processing a data set include: partitioning the data set into portions each including rows of data of the data set, a different one of the portions is included in a different one of a pages of a table, and rendering the pages of the table. A first number of rows of the data set is determined for a first page. The first number of rows is determined in accordance with a first plurality of heights including a height of a header section, a height of a footer section, heights of a plurality of margins, a total height of each page of the table, and a height of each row of the table. A second number of rows is determined for a second page. The second number of rows is determined in accordance with a second plurality of heights including at least some of the first plurality of heights.

19 Claims, 8 Drawing Sheets

(56) References Cited

U.S. PATENT DOCUMENTS

| | | | |
|---|---|---|---|
| 2014/0089774 A1* | 3/2014 | Lloyd | G06F 40/18 715/217 |
| 2017/0139874 A1* | 5/2017 | Chin | G06F 40/143 |
| 2017/0316084 A1* | 11/2017 | Pogrebtsov | G06F 16/26 |
| 2020/0142551 A1* | 5/2020 | Seiden | G06F 3/0485 |
| 2020/0142868 A1* | 5/2020 | Varadarajan | G06F 3/067 |

OTHER PUBLICATIONS

The Apache Software Foundation, Apache POI, "Apache POI—the Java for Microsoft Documents," https://poi.apache.org, Apr. 9, 2019.

* cited by examiner

TECHNIQUES FOR RENDERING A TABLE SPANNING MULTIPLE PAGES

BACKGROUND

Technical Field

This application generally relates to data sets, and more particularly, techniques used in connection with rendering data sets.

Description of Related Art

Data storage systems may include resources used by one or more host systems. Data storage systems and host systems may be interconnected by one or more communication connections such as in a network. These resources may include, for example, data storage devices such as those included in the data storage systems. These data storage systems may be coupled to one or more host systems where the data storage systems provide storage services to each host system. Multiple data storage systems from one or more different vendors may be connected and may provide data storage services for one or more host systems.

A host may perform a variety of data processing tasks and operations. For example, an application may executed on the host and the application may issue I/O (input/output) operations, such as data read and write operations, sent to the data storage system.

Host systems may store data to and/or retrieve data from a storage device included in a data storage system containing a plurality of host interface units, physical storage devices or drives, and physical storage interface units. The storage device may be a logical storage device. The host systems access the storage device through a plurality of channels provided therewith. Host systems may perform read and write operations through the channels to the data storage system and the data storage system provides the data to the host systems also through the channels. The host systems do not address the physical storage devices or drives of the data storage system directly, but rather, access what appears to the host systems as a plurality of logical storage devices or units (which may or may not correspond to the actual physical storage devices or drives). Allowing multiple host systems to access a single storage device allows the host systems to share data of the storage device. In order to facilitate sharing of the data on the storage device, additional software on the data storage systems may also be used.

SUMMARY OF THE INVENTION

Embodiments of the techniques herein include a method, computer readable medium and system for processing a data set comprising: receiving the data set; partitioning the data set into a plurality of portions each including rows of data of the data set, wherein a different one of the plurality of portions is included in a different one of a plurality of pages of a table, wherein said partitioning includes: determining a first number of rows of the data set to include in a first page of the plurality of pages, wherein the first number of rows is determined in accordance with a first plurality of heights including a height of a header section, a height of a footer section, heights of a plurality of margins, a total height of each page of the table, and a height of each row of the table; and determining a second number of rows of the data set to include in a second page of the table subsequent to the first page of the table, wherein the second number of rows is determined in accordance with a second plurality of heights including at least some of the first plurality of heights; and rendering the plurality of pages of the table. The second plurality of heights may include the height of the footer section, at least some of the heights of the plurality of margins, the total height of each page of the table, and the height of each row of the table, and wherein the second plurality of sizes does not include the height of the header section.

In at least one embodiment, determining the first number of rows, N, includes: calculating an available height, AH, on the first page of the table for rendering a first portion of the data set as:

$$AH = G - (A + B + C + D + E + F)$$

wherein G is the total height of each page of the table, A is a height of a top margin from a top of the first page to the header section, B is the height of the header section, C is a height of a margin between a bottom of the header section and a first row of the table included on the first page, D is a height of a margin between a last row of the first page and the footer section, E is the height of the footer section and F is a height of a margin between the footer section and a bottom of the first page. The first number of rows, N, may be determined in accordance with AH and the height of each row of the table.

In at least one embodiment, determining the second number of rows, N2, includes:

calculating an available height, AH2, on the second page of the table for rendering a second portion of the data set as:

$$AH2 = G - (A + D + E + F)$$

wherein G is the total height of each page of the table, A is a height of a top margin from a top of the second page to a first row of the table included on the second page, D is a height of a margin between a last row of the table included on the second page and the footer section, E is the height of the footer section and F is a height of a margin between the footer section and a bottom of the second page. The second number of rows, N2, may be determined in accordance with AH2 and the height of each row of the table. When table is rendered, the first page including the first number of rows may be placed in the table prior to any other of the plurality of pages of the table. When the table is rendered, the second page including the second number of rows may be placed in the table immediately subsequent to the first page. Each page of the plurality of pages appearing in the table subsequent to the second page when the table is rendered may have a layout identical to the second page. Each page of the plurality of pages that appears in the table subsequent to the second page when the table is rendered may have a number of rows equal to the second number of rows.

In at least one embodiment, each height included in the first plurality of heights and the second plurality of heights is expressed as a number of points denoting a vertical measurement of a rendered character. The table may be stored in a document in accordance with a specified file format used by a software application.

In at least one embodiment, processing may include displaying the data set in a user interface of an application; and selecting, using the user interface, a control that generates a report including the data set rendered as the table in the specified file format. The application may be a data storage system management application. The data set may include information about a plurality of entities in a data storage system. The plurality of entities may include at least one physical entity in the data storage system. The plurality of entities may include at least one logical entity in the data storage system.

BRIEF DESCRIPTION OF THE DRAWINGS

Features and advantages of the techniques herein will become more apparent from the following detailed description of exemplary embodiments thereof taken in conjunction with the accompanying drawings in which.

DETAILED DESCRIPTION OF EMBODIMENT(S)

Figure 1:
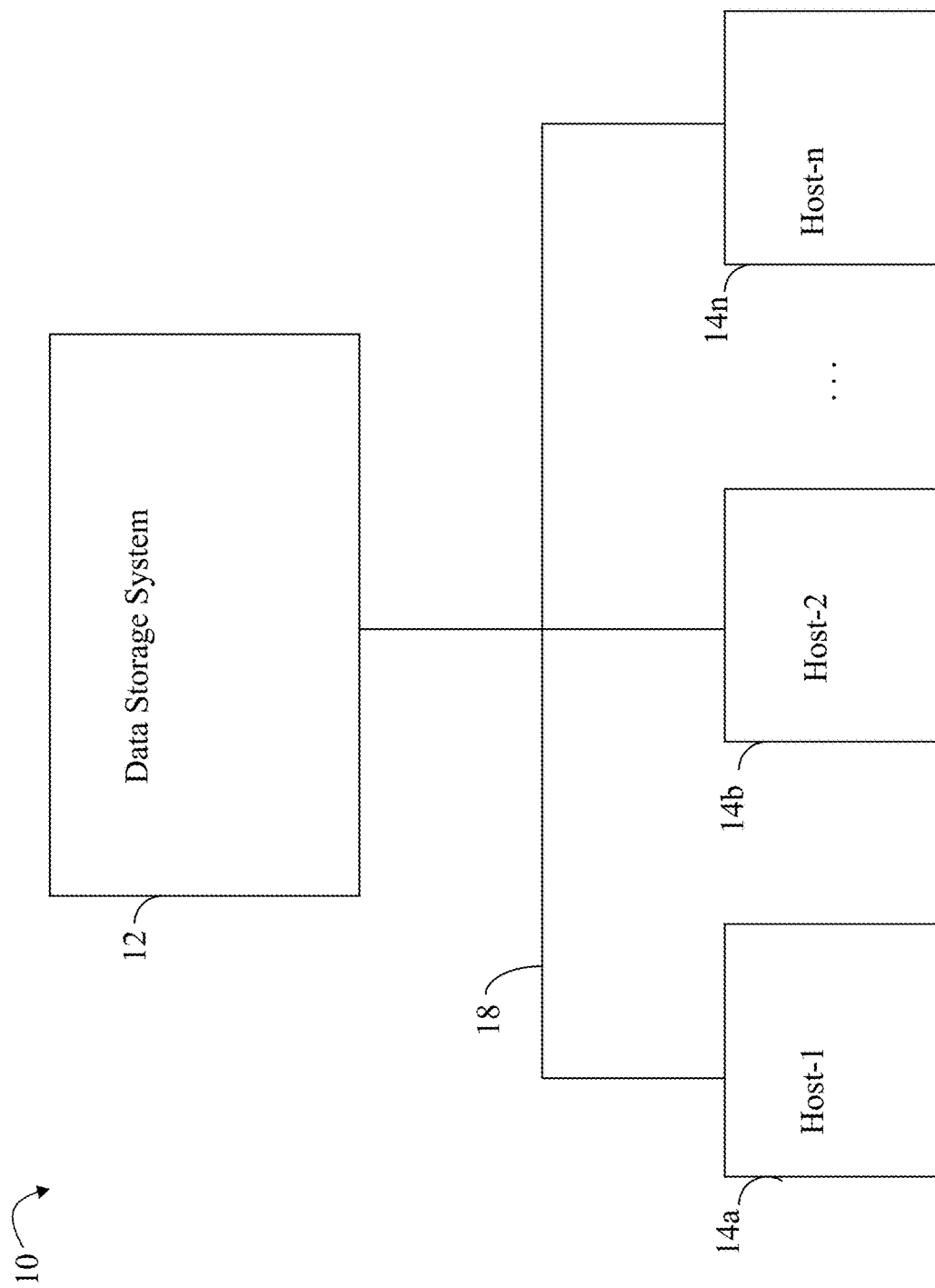
FIG. 1 is an example of an embodiment of a system that may utilize the techniques described herein.

Referring to FIG. 1, shown is an example of an embodiment of a system that may be used in performing the techniques described herein. The system 10 includes a data storage system 12, such as a data storage array, connected to the host systems 14a-14n through the communication medium 18. In this embodiment of the system 10, the N hosts 14a-14n may access the data storage system 12, for example, in performing input/output (I/O) operations or data requests. The communication medium 18 may be any one or more of a variety of networks or other type of communication connections as known to those skilled in the art. The communication medium 18 may be a network connection, bus, and/or other type of data link, such as a hardwire or other connection known in the art. For example, the communication medium 18 may be an intranet, network or other wireless or other hardwired connection(s) by which the host systems 14a-14n may access and communicate with the data storage system 12, and may also communicate with other components included in the system 10.

Each of the host systems 14a-14n and the data storage system 12 included in the system 10 may be connected to the communication medium 18 by any one of a variety of connections as may be provided and supported in accordance with the type of communication medium 18. The processors included in the host computer systems 14a-14n may be any one of a variety of proprietary or commercially available single or multi-processor system, such as an Intel-based processor, or other type of commercially available processor able to support traffic in accordance with each particular embodiment and application.

It should be noted that the particulars of the hardware and software included in each of the components that may be included in the data storage system 12 are described herein in more detail, and may vary with each particular embodiment. Each of the host computers 14a-14n and the data storage system may all be located at the same physical site, or, alternatively, may also be located in different physical locations. The communication medium that may be used to provide the different types of connections between the host computer systems and the data storage system of the system 10 may use a variety of different block-based and/or file-based communication protocols such as TCP/IP, SCSI (Small Computer Systems Interface), Fibre Channel, iSCSI, Fibre Channel over Ethernet, NVMe (Non-Volatile Memory Express) over Fabrics, Network File System (NFS), and the like. Some or all of the connections by which the hosts and the data storage system 12 may be connected to the communication medium 18 may pass through other communication devices, switching equipment that may exist such as a phone line, a repeater, a multiplexer or even a satellite.

Each of the host computer systems may perform different types of data operations. In the embodiment of FIG. 1, any one of the host computers 14a-14n may issue a data request to the data storage system 12 to perform a data operation. For example, an application executing on one of the host computers 14a-14n may perform a read or write operation resulting in one or more data requests to the data storage system 12. It should be noted that the data storage system 12 of FIG. 1 may physically be a single data storage system, as well one or more other data storage systems as may vary with the embodiment.

Figure 2A:
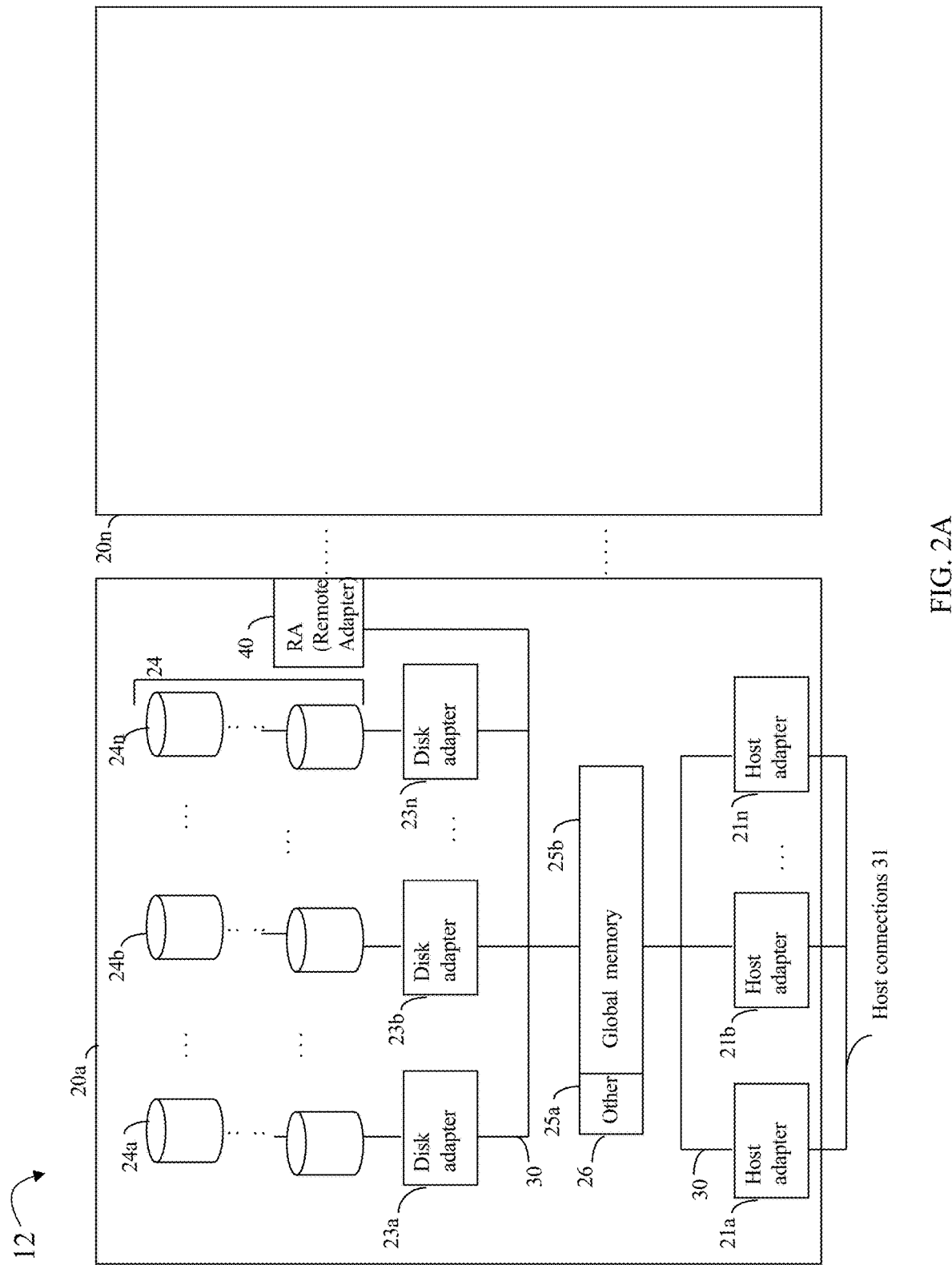
FIG. 2A is an example of an embodiment of a data storage system.

Referring to FIG. 2A, shown is an example of an embodiment of the data storage system 12 that may be included in the system 10 of FIG. 1. Included in the data storage system 12 of FIG. 2A are one or more data storage systems 20a-20n as may be manufactured by one or more different vendors. Each of the data storage systems 20a-20n may be interconnected (not shown). Additionally, the data storage systems may also be connected to the host systems through any one or more communication connections 31 that may vary with each particular embodiment and device in accordance with the different protocols used in a particular embodiment. The type of communication connection used may vary with certain system parameters and requirements, such as those related to bandwidth and throughput required in accordance with a rate of I/O requests as may be issued by the host computer systems, for example, to the data storage system 12. In this example as described in more detail in following paragraphs, reference is made to the more detailed view of element 20a. It should be noted that a similar more detailed description may also apply to any one or more of the other elements, such as 20n, but have been omitted for simplicity of explanation. It should also be noted that an embodiment may include data storage systems from one or more vendors. Each of the data storage systems 20a-20n may be resources included in an embodiment of the system 10 of FIG. 1 to provide storage services to, for example, the host computer systems. It should be noted that the data storage system 12 may operate stand-alone, or may also be included as part of a storage area network (SAN) that includes other components.

Each of the data storage systems, such as 20a, may include a plurality of disk devices or volumes, such as the arrangement 24 consisting of n rows of disks or more generally, data storage devices, 24a-24n. In this arrangement, each row of the disks may be connected to a disk adapter ("DA") or director responsible for the backend management of operations to and from a portion of the disks 24. In the system 20a, a single DA, such as 23a, may be responsible for the management of a row of disks, such as row 24a. In a data storage system, a backend DA may also be referred to as a disk controller. The DA may perform operations such as reading data from, and writing data to, the physical devices which are serviced by the DA.

It should be noted that, more generally, the physical devices or data storage devices 24a-24n may be any suitable type of physical storage device or media, such as any form of a suitable back-end non-volatile storage device. For example, physical devices included in an embodiment of a data storage system may include one or more types of rotating disk drives (e.g., SATA, SAS, FC 15K RPM, FC 10K RPM), one or more types of flash-based storage devices, or more generally solid state drives (SSDs), such as SSDs that communicate using the NVMe protocol, and the like.

Also shown in the storage system 20a is an RA or remote adapter 40. The RA may be hardware including a processor used to facilitate communication between the data storage systems, such as between two of the same or different types of data storage systems.

The system 20a may also include one or more host adapters ("HAs") or directors 21a-21n. Each of these HAs may be used to manage the communications and data operations between one or more host systems and the global memory. In an embodiment, the HA may be a Fibre Channel Adapter (FA) or other adapter which facilitates host communication. Generally, the directors may also be characterized as the different adapters, such as the HAs (including FAs), DAs, RAs and the like, as described herein. Components of the data storage system, such as an HA, which may communicate with a host (e.g., receive the host I/O commands and send the responses to the host) may also be referred to as front end components. A DA is an example of a backend component of the data storage system which may communicate with a front end component. In connection with the data storage systems, various types of directors or adapters may be implemented as a processor, or, more generally, a component that includes the processor. Examples of directors are DAs, HAs, RAs, and the like, such as described herein.

One or more internal logical communication paths may exist between the DAs, the RAs, the HAs, and the memory 26. An embodiment, for example, may use one or more internal busses and/or communication modules. For example, the global memory portion 25b may be used to facilitate data transfers and other communications between the DAs, HAs and RAs in a data storage system. In one embodiment, the DAs 23a-23n may perform data operations using a cache that may be included in the global memory 25b, for example, in communications with other the disk adapters or directors, and other components of the system 20a. The other portion 25a is that portion of the memory that may be used in connection with other designations that may vary in accordance with each embodiment.

The particular data storage system as described in this embodiment, or a particular device thereof, such as a disk, should not be construed as a limitation. Other types of commercially available data storage systems, as well as processors and hardware controlling access to these particular devices, may also be included in an embodiment.

The host systems provide data and access control information through channels to the storage systems, and the storage systems may also provide data to the host systems also through the channels. The host systems do not address the disk drives of the storage systems directly, but rather access to the data may be provided to one or more host systems from what the host systems view as a plurality of logical devices or logical units. A logical unit (LUN) may be characterized as a disk array or a data storage system reference to an amount of disk space that has been formatted and allocated for use by one or more hosts. A logical unit may have a logical unit number that is an I/O address for the logical unit. As used herein, a LUN or LUNs may refer to the different logical units of storage which may be referenced by such logical unit numbers. The LUNs may or may not correspond to the actual or physical disk drives. For example, the one or more LUNs may reside on a single physical disk drive. Data in a single storage system may be accessed by multiple hosts allowing the hosts to share the data residing therein. The HAs may be used in connection with communications between a data storage system and a host system. The RAs may be used in facilitating communications between two data storage systems. The DAs may be used in connection with facilitating communications to the associated disk drive(s) and the LUN(s) residing thereon.

The DA physically accesses the back-end non-volatile storage devices, such as the physical data storage devices (PDs) denoted by 24 of FIG. 2A. Data residing on a PD may be accessed by the DA following a data request in connection with I/O operations that other directors originate. In at least one embodiment, write data received at the data storage system from a host or other client may be initially written to a cache memory (e.g., such as may be included in the component designated as 25b) and marked as write pending. Once written to the cache, the host may be notified that the write operation has completed. At a later point time, the write data may be destaged from the cache to the physical storage device, such as the non-volatile physical storage device (PDs of 24) accessed by a DA. In connection with reads, processing may include first looking to see if the requested read data is in the cache whereby a read hit occurs. For a read hit, the read is serviced using the cached copy of the requested read data by returned the cached read data to the requester. Thus, with a read hit, there is no need to access the physical (back end) non-volatile storage by the DA to obtain the requested read data thereby resulting in a faster read I/O response time (RT). If the requested read data is not in the cache, the requested read data is obtained from the physical (back end) non-volatile storage by the DA where the read data is then stored in the cache, and returned to the requester. The cached copy of the read data may then be available to further service any other subsequent reads. As known in the art, any suitable cache management technique may be used to maintain the cache, for example, such as in determining how long data remains in the cache, whether to prefetch data, selecting data stored in the cache for eviction, and the like.

Figure 2B:
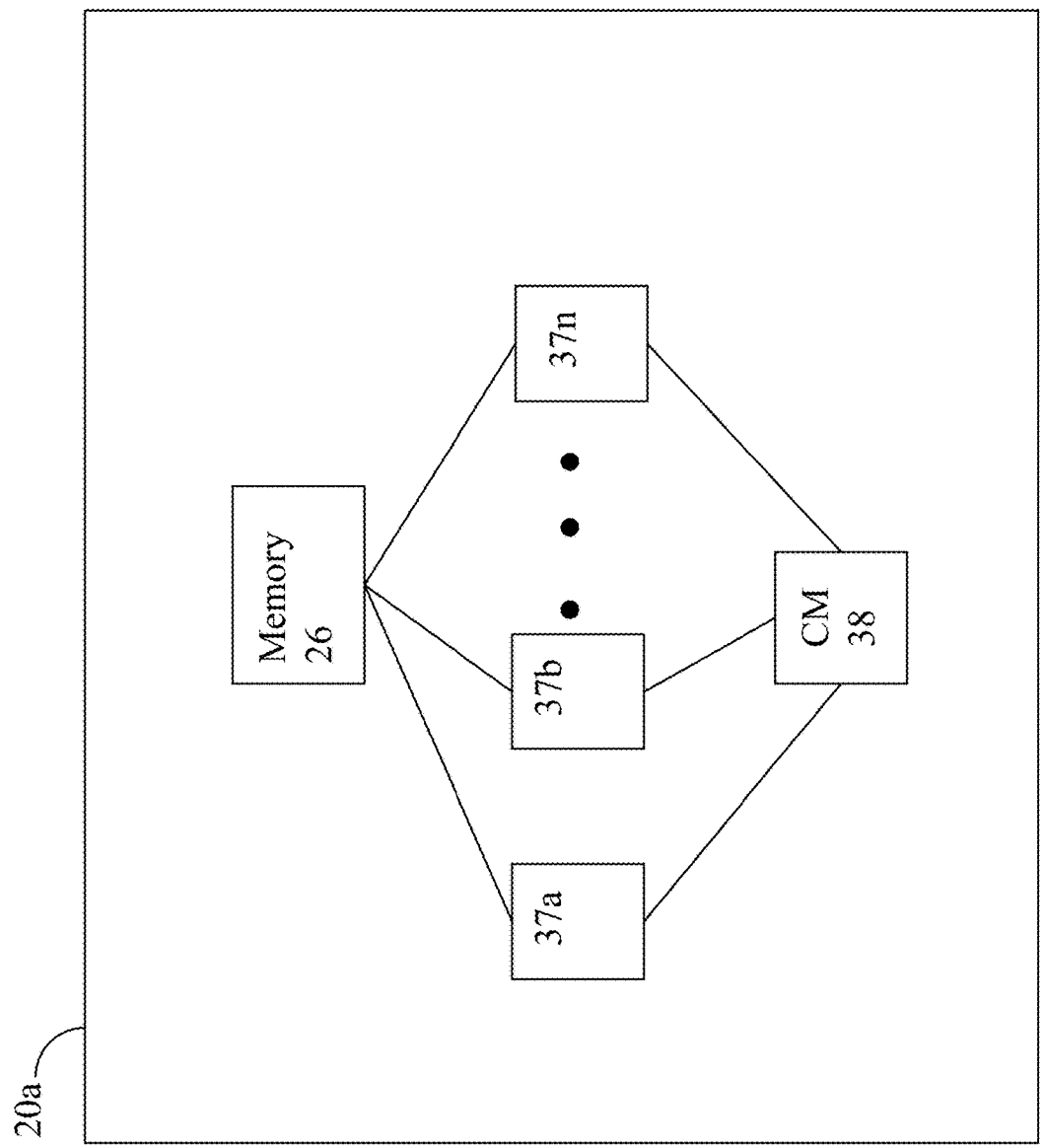
FIG. 2B is a representation of the logical internal communications between the directors and memory included in one embodiment of the data storage system of FIG. 2A.

Referring to FIG. 2B, shown is a representation of the logical internal communications between the directors and the memory included in a data storage system. Included in FIG. 2B is a plurality of directors 37a-37n coupled to the memory 26. Each of the directors 37a-37n represents one of the HAs, RAs, or DAs that may be included in a data storage system. Each of the directors may be, for example, a processor or a printed circuit board that includes a processor and other hardware components. The representation of FIG. 2B also includes an optional communication module (CM) 38 that provides an alternative communication path between the directors 37a-37n. Each of the directors 37a-37n may be coupled to the CM 38 so that any one of the directors 37a-37n may send a message and/or data to any other one of the directors 37a-37n without needing to go through the memory 26. The CM 38 may be implemented using conventional MUX/router technology where a sending one of the directors 37a-37n provides an appropriate address to cause a message and/or data to be received by an intended receiving one of the directors 37a-37n. In addition, a sending one of the directors 37a-37n may be able to broadcast a message to all of the other directors 37a-37n at the same time.

A host may be able to access data, such as stored on a LUN of a data storage system, using one or more different paths from the host to the data storage system. A data storage system device, such as a LUN, may be accessible over multiple paths between the host and data storage system. Thus, a host may select one of possibly multiple paths over which to access data of a storage device.

It should be noted that the particular exemplary architecture of a data storage system such as, for example, in FIGS. 2A and 2B is merely illustrative of one such architecture that may be used in connection with the techniques herein. Those skilled in the art will appreciate that the techniques herein may be used with any suitable data storage system. For example, FIG. 2B provides an example of components that may be included in a separate physical fabric used for control communications sent between components of the data storage system. Some embodiments may use separate physical fabrics for each of data movement and control communications between data storage system components. Alternatively, some embodiments may use a same shared physical fabric for both data movement and control communication functionality rather than have a separate control communications fabric such as illustrated in FIG. 2B.

In an embodiment of a data storage system in accordance with the techniques herein, the components such as HAs, DAs, and the like may be implemented using one or more "cores" or processors each having their own memory used for communication between the different front end and back end components rather than utilize a global memory accessible to all storage processors.

It should be noted that although examples of the techniques herein may be made with respect to a physical data storage system and its physical components (e.g., physical hardware for each HA, DA, HA port and the like), techniques herein may be performed in a physical data storage system including one or more emulated or virtualized components (e.g., emulated or virtualized ports, emulated or virtualized DAs or HAs), and also a virtualized or emulated data storage system including virtualized or emulated components.

The data storage system may provide various data services. For example, in at least one embodiment in accordance with the techniques herein, a data storage system may provide one or more data reduction services in efforts to reduce the size of the stored data, for example, stored on the backend non-volatile storage PDs of the data storage system. In at least one embodiment, the data reduction services may include compression. In at least one embodiment, the data services may include local and/or remote data replication services.

The data path or I/O path may be characterized as the path or flow of I/O data through a system. For example, the data or I/O path may be the logical flow through hardware and software components or layers in connection with a user, such as an application executing on a host (e.g., more generally, a data storage client) issuing I/O commands (e.g., SCSI-based commands, and/or file-based commands) that read and/or write user data to a data storage system, and also receiving a response (possibly including requested data) in connection such I/O commands.

The data path or I/O path may be contrasted with a control path. The data or I/O path and control path define two sets of different logical flow paths. The control path, also sometimes referred to as the management path, may be characterized as the path or flow of data management or control commands through a system. For example, the control or management path may be the logical flow through hardware and software components or layers in connection with issuing data storage management command to and/or from a data storage system, and also receiving responses (possibly including requested data) to such control or management commands. For example, with reference to the FIG. 1, the control commands may be issued from data storage management software executing on a management system, such as another computer system or other device with a processor that is connected to the data storage system 12. Such commands may be, for example, to establish or modify data services; view performance or health of various system components and storage entities; provision storage; perform user account management; and the like. For example, commands may be issued over the control path to provision storage for LUNs; define a storage group (SG) which is a logically defined group of one or more LUNs; create a snapshot; define conditions of when to create another snapshot; define or establish local and/or remote replication services; define or modify a schedule for snapshot or other data replication services; define a RAID group; obtain data storage management and configuration information for display in a graphical user interface (GUI) of a data storage management program or application; generally modify one or more aspects of a data storage system configuration; view properties, performance, and/or status information regarding LUNs or other storage objects (e.g., physical and/or logical entities in the data storage system); and the like.

In at least one embodiment, a data storage system management application may be used to produce reports including selected information. For example, the data storage system management application may include a GUI where a user may select to list or view information about storage entities of interest. For example, a user may select to view information on a list of SGs and information about each such SG. The user may also select to generate a report including the list of SGs and information about each such SG. In at least one existing system, the report generated may be in a particular file format, such as file format used with Microsoft® PowerPoint®. As known in the art, Microsoft® PowerPoint® is a software package designed to create electronic presentations consisting of a series of separate pages or slides.

A file format may be characterized as a way in which information is encoded for storage in a file. The file format specifies how bits are used to encode information stored in a storage medium, such as files stored on a form of computer readable media or memory. File formats may be proprietary as well as non-proprietary. As an example, Microsoft® Office has multiple file formats for different software products, such as Microsoft® Word, Microsoft® Excel, and Microsoft® PowerPoint®.

In connection with a file format, such as the file format for Microsoft® PowerPoint® used for report generation as noted above, the Microsoft® PowerPoint® application typically used with that file format may not provide support for table pagination. In particular, in such an application, there may be no support for table pagination across multiple slides. In other words, the data set rendered in a table may have to fit within a single page or slide.

In some instances, a library having defined APIs (application programming interfaces) may be used in connection with processing or accessing a data set, where the data set may be stored in a particular file format used by an application, such as Microsoft® PowerPoint®. For example, Apache POI, a project run by the Apache Software Foundation, provides Java libraries for reading and writing files in Microsoft® Office Formats, such as Microsoft® PowerPoint®. More generally, such libraries provide support for performing different operations in connection with data sets stored in different file formats, such as a file format used by Microsoft® PowerPoint®.

The Apache POI libraries noted above provide APIs that may be used to perform operations and processing of a data set used with Microsoft® PowerPoint®. However, at least one version of the Apache POI library does not include APIs providing table pagination across multiple slides or pages when rendering a table used with Microsoft® PowerPoint®. For example, with the Apache POI library, if a data set is passed to an API of the library to render the data set in the form of a table stored in a file having the Microsoft® PowerPoint® file format, and the data set of the table spans more than a single page, the content of the table overflows and will not span multiple slides or pages.

Described in following paragraphs are techniques that may be used to render a table in a document. The document may have a particular file format used by one or more particular applications. For example, in at least one embodiment, the file format may be the Microsoft® PowerPoint® file format used by the Microsoft® PowerPoint® application or software package. The techniques in following paragraphs provide pagination for rendering a data set spanning multiple pages or slides. Pagination may be characterized as a process of partitioning a document or data set into pages, such as electronic pages or printed pages. In at least one embodiment, the data set may be included in a table spanning multiple pages or slides. In at least one embodiment, one or more pagination controls may be configurable and exposed to the user for customizing the pagination of the data set spanning multiple pages or slides. The one or more pagination controls may affect one or more attributes of the table or content of the table as rendered.

The foregoing and other aspects of the techniques herein are described in more detail in following paragraphs.

Figure 3:
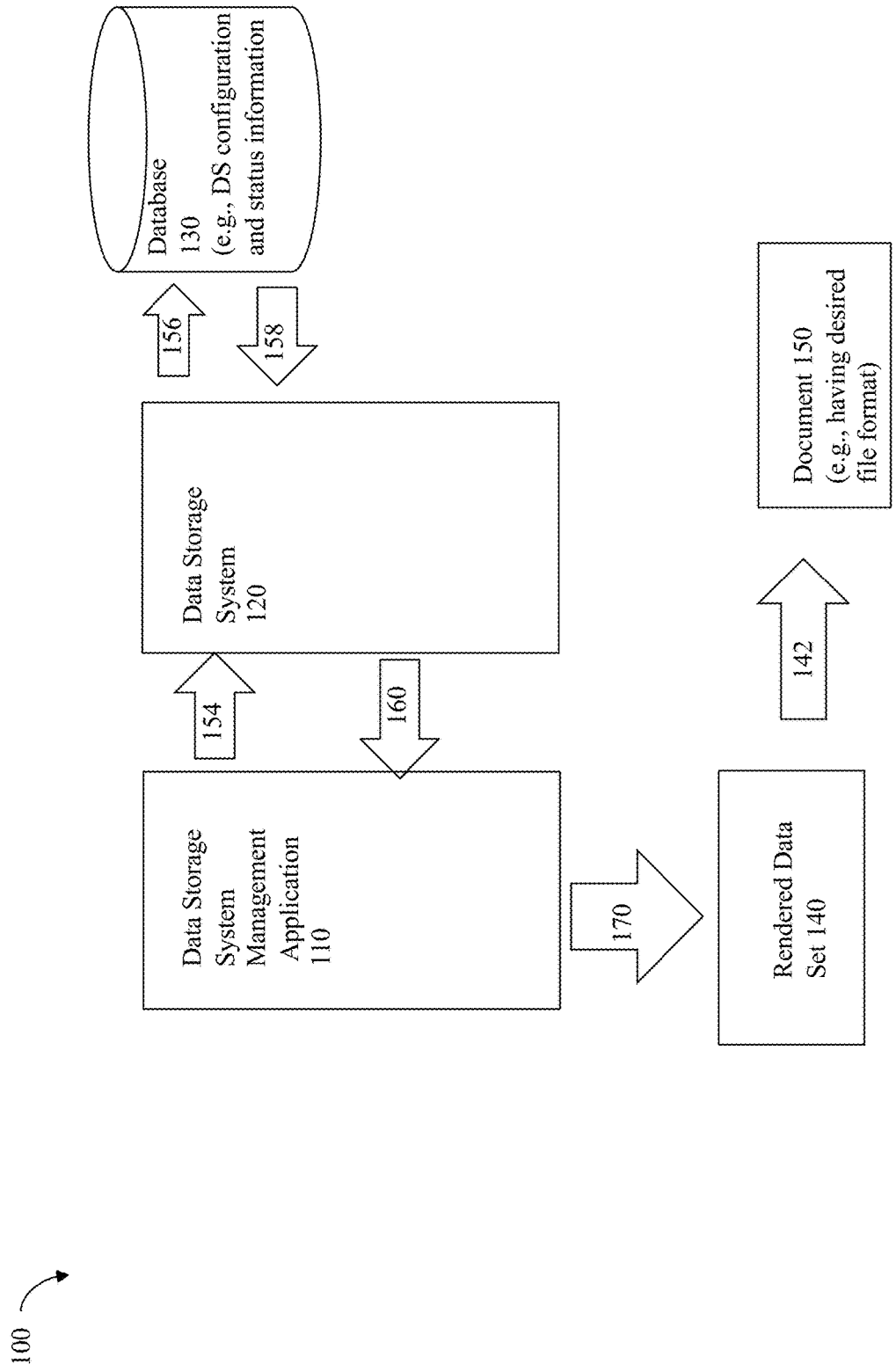
FIG. 3 is an example of systems, data and other components that may be used in at least one embodiment in accordance with the techniques herein.

Referring to FIG. 3, shown is an example of systems, data and other components that may be used in at least one embodiment in accordance with the techniques herein. The example 100 includes the data storage management application 110, the data storage system 120, the rendered data set 140, the database 130, and the document 150 having a desired file format, such as the Microsoft® PowerPoint® file format.

The data storage system management application 110, or more generally any application having a user interface (UI) such as a GUI, may have one or more UI controls where the user may make UI selections to create a view that displays a data storage system dashboard populated with various information, for example, regarding the data storage system I/O performance; regarding performance, resource utilization or consumption, or other information about physical and/or logical storage entities or objects (e.g., SGs, cache metrics (e.g., cache hit ratio; amount of cache consumed for write pending (WP) cached data), host I/O rate and data transfer rate, backend I/O rate) of the data storage system, and the like. In such a case, the data storage management application 110 may perform processing including executing code that constructs and initializes data structures for the tables or charts, requests necessary data from the data storage system 120 or server where the data is used to populate the tables or charts, implement polling or another technique used to obtain revised data used to refresh the tables or charts periodically, implementing the visual aspects of the rendered charts and tables (e.g., attributes related to the look and feel and styling of the charts and tables when rendered in the UI), and the like. Thus, the data storage system management application 110 may perform the various tasks for the often numerous rendered views of charts and tables.

In at least one embodiment in accordance with the techniques herein, the data storage system management application 110 may execute in the context of a browser where a data set 140 may be generated and rendered based on a requested query from user selections made using the GUI. The data set 140 may be displayed or rendered within the browser windows.

As may be needed, the data storage system management application 110 may issue requests (154) to the data storage system 120 to obtain data of the data set 140 from the data storage system 120. The requests 154 may be in response to user requests for various data as made using the GUI of the data storage system management application 110. Subsequently, the data storage system 120 may issue one or more requests 156, such as database queries, to the database 130 to obtain the requested data. In at least one embodiment, the database 130 may be stored on the data storage system 120. As a variation, the database 130 may be located on a different system, such as at a different location accessible via a network connecting the data storage system 120 and the database 130. The data requested may be returned 158 from the database 130 to the data storage system 120, and then further returned 160 to the data storage system management application 110. The application 110 may handle rendering 170 the data set 140 in the UI display or view. Additionally, the data set 140 may be exported or stored 142 in a document 150 having a desired file format. For example, in at least one embodiment, UI selections may be made by a user of the application 110 to generate a table of data denoted as the data set 140. The data set 140 may be rendered for display in the UI of the application 110, such as in a browser window. Subsequently, the user may select, using the UI, to generate a report and store the data set 140 as a table in the document 150 having a particular file format, such as the Microsoft® PowerPoint® file format used by the Microsoft® PowerPoint® application. More generally, the techniques described in following paragraphs may be used in connection with the data set 140 stored (142) in the document 150 having any desired file format. The particular file format of the document 150 may vary in accordance with the particular application used to view and generally utilize the generated document 150.

It should generally be noted that the application 110 may facilitate exporting or storing 142 the data set 140 in the document 150 in a desired file format using any suitable technique. For example, one or more libraries may be used to facilitate storing the data set 140 as a table or other entity in the document 150 having a specified file format.

The database 130 may generally include information about the data storage system 120. For example, in at least one embodiment, the database 130 may include data storage system configuration, performance, and status information. For example, the database 130 may include configuration information regarding the various physical and logical storage objects or entities in the data storage system (e.g., configured SGs, provisioned LUNs, configured RAID groups). The database 130 may, for example, identify what LUNs are included in an SG, what one or more RAID groups the LUNs have storage provisioned from, what physical storage devices are included in each RAID group configuration, the particular RAID level of a RAID group, and what is the capacity of a LUN, what is the amount of used and free storage of SGs, LUNs, and RAID groups.

The database 130 may include performance information, such as various performance metrics, regarding the physical and logical storage objects in the system 120. For example, the database 130 may include information regarding I/Os such as host or front end I/O rate, host or front end I/O data transfer rate or bandwidth (e.g., MBs/second), backend (BE) I/O rate, BE data transfer rate or bandwidth, utilization of different physical components of the system (e.g., cache utilization, HA utilization DA utilization), cache hit ratio or rate, and amount of cache consumed for WP data waiting to be destaged.

Thus, in at least one embodiment, the user requests for information issued using the UI of the application 110 result in the application 110 issuing the requests 154 to obtain the needed data from the system 120 and the database 130 to generate the data set 140. As noted above, for example, a table may be initially displayed or rendered on a UI and then populated periodically with updated or revised information as may be needed. At some point in time, a user may request to generate a report and store the table of information, or more generally the data set 140 displayed or rendered on the UI, in a document 150. In at least one embodiment, the table of information (e.g., data set 140) may be exported by the data storage system management application 110 and stored in the document 150.

What will now be described are techniques that may be used in connection with storing or rendering the data set, such as in the form of a table, in a document 150. The data set may be rendered in the table in the document 150 where the data set, when stored in the form of the table, spans multiple pages or slides. The techniques utilize and algorithm that iterates over the data set and partitions the data set into buckets or portions, one bucket or portion per page. In at least one embodiment, the first rendered page of the table includes a first bucket or portion of the data set along with a header section. In such an embodiment, subsequent pages of the including portions or buckets of the data set may not include a header section.

In following paragraphs, reference is made to an example embodiment in which the data set is rendered in the form of a table spanning multiple pages where the first page includes the header section and subsequent pages do not include the header section. Additionally, for simplicity of illustration, a font size of 7 points (pts) is selected for all text portions of the table. More generally, such techniques may be used in connection with any suitable font size and may further vary the font size in different portions or sections of the table. Further, an embodiment may expose one or more pagination controls or parameters to a user and make such controls or parameters configurable by a user. For example, an embodiment may provide a pagination control or parameter where a user may specify a character set and an associate font size used for text included in the table, or portions or sections of the table.

Generally, the font size or text size is the overall size or height of a font shown on a screen or printed on a page. A font is typically measured in a point (pt) size, which is the vertical measurement of the lettering. For example, there are approximately 72 (72.272) points in one inch or 2.54 cm. In typography, the point is the granularity or unit of measurement used in connection with measuring font size and other items on a printed or rendered page.

Figure 4:
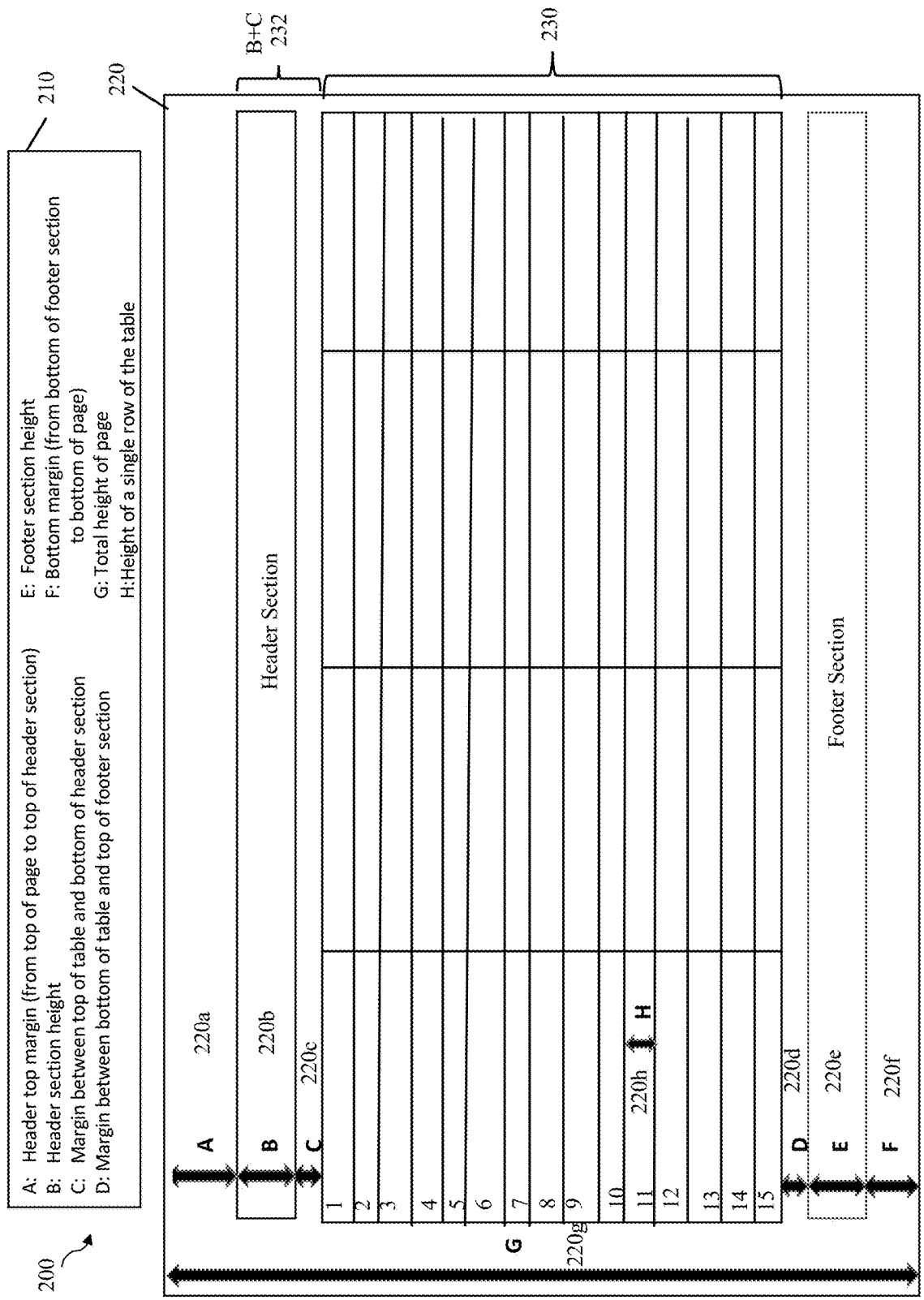
FIG. 4 is an example illustrating a layout of a first page of a table rendered in at least one embodiment in accordance with the techniques herein.
Figure 5:
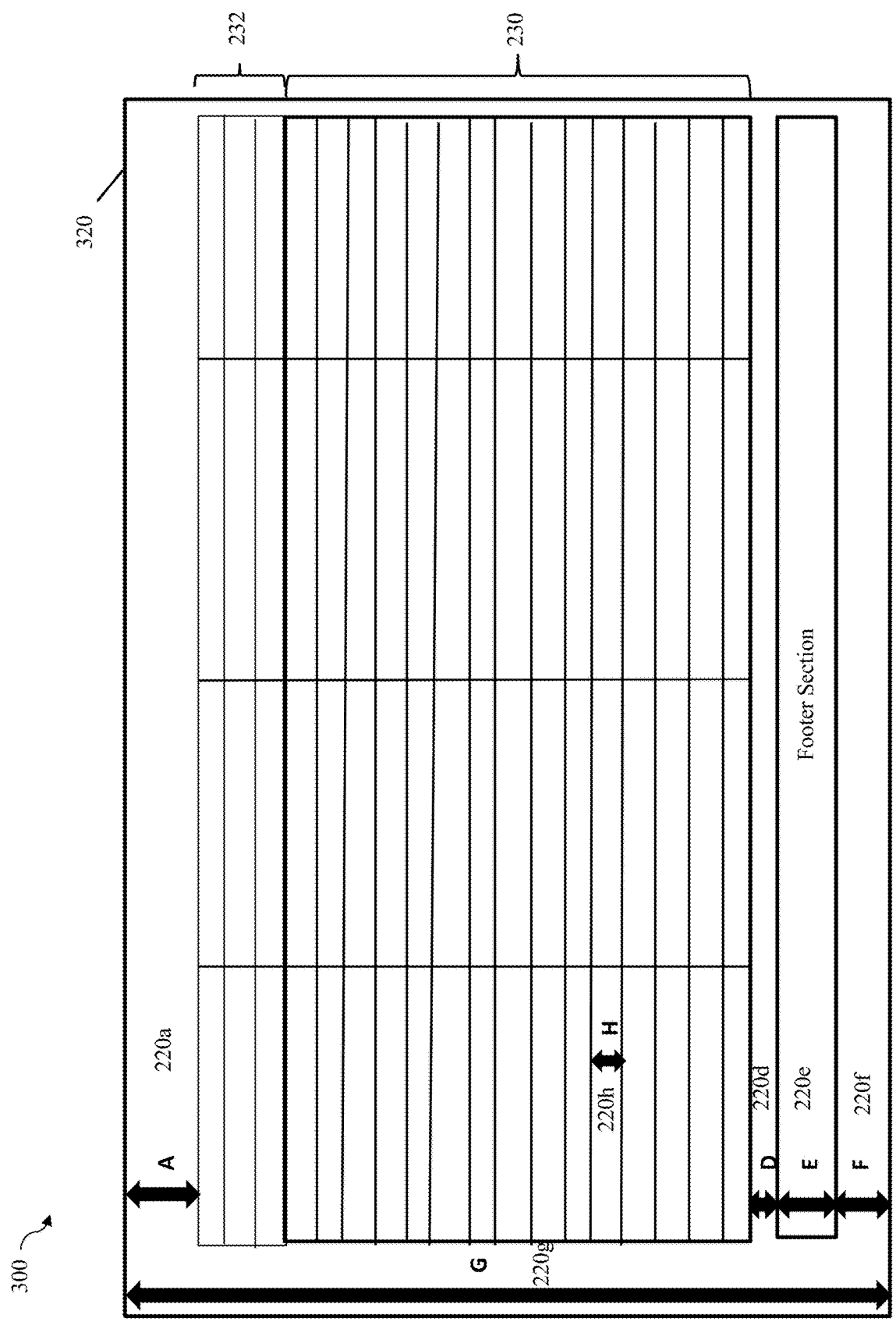
FIG. 5 is an example illustrating a layout of a second and subsequent pages of a table rendered in at least one embodiment in accordance with the techniques herein.

FIGS. 4 and 5 described below illustrate how a data set may be rendered as a table on multiple pages or slides in at least one embodiment in accordance with the techniques herein.

Referring to FIG. 4, shown is an example illustrating a layout for a first page of a table including a data set rendered in an embodiment in accordance with the techniques herein. The example 200 includes a legend 210 identifying the different portions or sections of the rendered first page of the table. Element 220 illustrates the layout of the first page of the rendered table including a first portion of the data set.

With the rendered first page 220, element A 220a denotes the header top margin from the top of the page 220 to the top of the header section B 220b. Element 220b B denotes the header section that may include, for example, a header of the table. In at least one embodiment, the sections or portions denoted by 220aA and 220bB may only be included in the first page of the table. As discussed below in connection with FIG. 5 in at least one embodiment, the sections or portions denoted by 220a A and 220b B are omitted from subsequent pages of the table including different portions of the data set.

Element 230 denotes the first portion or bucket of the data set rendered on the first page 220. In particular 230 includes rows of the data set rendered in the first page 220 of the table. In this example, the first portion or bucket 230 of the data set on the first page 220 includes 15 rows of the data set where each row includes 4 columns. More generally, the table format for the data set portion 230 may include any number of columns and a number of rows that are calculated and determined using techniques described below in more detail.

Element 220c C denotes the margin between the bottom of the header section 220b and the top of the table 230. Element D 220d denotes the margin between the bottom of the first portion of the data set 230 included in the table. Element 220e E denotes the footer section of the table where a footer of the table may be stored. Element 220f F denotes the bottom margin between the bottom of the footer section 220e and the bottom of the page 220. Element 220h H denotes the size or height of a single row of the table where each row of the table in this example is the same size or height. Element 220g G denotes the total height or size of the page 220.

Generally, element 220g G denotes the total height or size of each single page. To determine the size or height of space available on the first page for rendering a first portion of the data set in the table, an embodiment in accordance with the techniques herein may perform a calculation that subtracts a quantity from G, where the quantity denotes the size or height of all required sections or portions other than the data set. For example, in at least one embodiment as illustrated in FIG. 4, sections denoted by A 220a, B 220b, C 220c, D 220d, E 220e and F 220f may all be included in the first page 220. Any remaining height of the page 220 may be used for rendering a first portion 230 of the data set in the form of rows of the table. The following EQUATION 1 represents the calculation performed to determine the available height, AH, on the first page for rendering a first portion of the data set:

$$AH = G - (A+B+C+D+E+F) \qquad \text{Equation 1}$$

Where

AH is the available height, in terms of number of points, available for rendering a first portion of the data set in the table;

G is the height or size in points of the page;

A is the height or size in points of the header top margin 220a (e.g., from the top of the first page to the top of the header section 220b B in the first page);

B is the height or size in points of the header section 220b;

C is the height or size in points of the margin 220c;

D is the height or size in points of the margin 220d;

E is the height or size in points of the footer section 220e; and

F is the height or size in points of the bottom margin 220f.

As noted above, assume that all lines of text include a 7 point font size and that each row of the table includes a single line of text. More generally FSIZE may denote the font size expressed as a number of points. Although 7 points is the font size used in this example, more generally any suitable font size may be used in connection with the techniques herein. Thus, in the example 200, FSIZE=7 and H=7.

The number of rows, N, of the table that may be stored on the first page in 230 may be calculated as follows based on EQUATION 2:

$$N=AH/FSIZE \qquad \text{Equation 2}$$

Where

N is the number of rows of the table that may be rendered on the first page; FSIZE is as described above; and AH is determined using EQUATION 1, denoting the available height on the first page for rendering a first portion 230 of the data set.

Generally, based on the above using EQUATIONS 1 and 2, N denotes the number of rows of the table rendered in 230 on the first page.

In at least one embodiment, portions or sections 220b B and 220c C may only be included in the first page of the table rendered. Thus, element 232 denotes the additional available height in the second and subsequent pages (following the first page) that may be used for rendering additional rows of the data set in the table.

Referring to FIG. 5, shown is shown is an example 300 illustrating a layout for the second and subsequent pages of the table including a data set rendered in an embodiment in accordance with the techniques herein. Element 320 illustrates the layout of the second and subsequent pages of the rendered table, where each such page includes a next subsequent portion of the data set.

For discussion purposes, reference is made to FIG. 5 in connection with rendering a second page of the table including a second portion of the data set rendered in the table. The second page 320 is illustrated as having a total height or size G 220g and also including sections or portions A 220a, D 220d, E 220e and F 220f as described above. It should be noted that the section or portion A 220a in FIG. 4 is the margin between the top of the first page to the top of the header section. However, in the second or subsequent page, there is no header section so the section or portion A 220a in FIG. 5 is the margin between the top of the second or subsequent page and the first row of the data set included in the second or other subsequent page.

Element 230 in the FIGS. 4 and 5 denote a first height or portion of a page that may be used for rendering rows of the data set in the table. In the FIG. 4, element 230 is the total available height of the first page that can be used for rendering rows of the data set in the table.

Note that the second page 320 omits sections or portions B 220b and C 220c as illustrated on the first page 220 of FIG. 4. Element 232 in FIGS. 4 and 5 denotes the height or size of the sections or portions B 220b and C 220c. In the FIG. 5, element 232 denotes additional available height that may be used for rendering rows of the data set on the second page. Thus, in the page 320 of FIG. 5, elements 230 and 232 denote the total available height in the second page, and subsequent pages, that may be used for rendering rows of the data set in the table.

To determine the size or height of space available on each of the second and subsequent pages for rendering portions of the data set in the table, an embodiment in accordance with the techniques herein may perform a calculation that subtracts a second quantity from G, where the second quantity denotes the size or height of all required sections or portions in the page other than the data set. For example, in at least one embodiment as illustrated in FIG. 5, sections denoted by A 220a, D 220d, E 220e and F 220f may all be included in the second page 320. Any remaining height of the page 320 may be used for rendering a second portion (e.g., denoted by 230 and 232) of the data set in the form of rows of the table. The following EQUATION 3 represents the calculation performed to determine the available height, AH2, on each of the second and subsequent pages for rendering a portion of the data set:

$$AH2=G-(A+D+E+F) \qquad \text{Equation 3}$$

Where

AH2 is the available height, in terms of number of points, available for rendering a next portion of the data set in the table;

G is the height or size in points of the page;

A is the height or size in points of the header top margin 220a (e.g., from the top of the page to the first row of the data set included in the second or other subsequent page);

D is the height or size in points of the margin 220d;

E is the height or size in points of the footer section 220e; and

F is the height or size in points of the bottom margin 220f.

As noted above, assume that all lines of text include a 7 point font size and that each row of the table includes a single line of text. More generally FSIZE may denote the font size expressed as a number of points. Although 7 points is the font size used in this example, more generally any suitable font size may be used in connection with the techniques herein. Thus, in the example 300, FSIZE=7 and thus H=7.

The number of rows, N2, of the table that may be stored on each of the second and subsequent pages 320 may be calculated as follows based on EQUATION 4:

$$N2=AH2/FSIZE \qquad \text{Equation 4}$$

Where

N2 is the number of rows of the table that may be rendered on each of the second and subsequent pages;

FSIZE is as described above; and

AH2 is determined using EQUATION 3, denoting the available height on each of the second and subsequent pages for rendering a next portion of the data set. Element 232 and 230 denote AH2.

Generally, based on the above using EQUATIONS 3 and 4, N2 denotes the number of rows of the table rendered in the total height denoted by 230 and 232 on each of the second and subsequent pages of the table.

Based on the foregoing, an embodiment in accordance with the techniques herein may perform processing to determine a maximum number of rows of the data set that can be rendered on each page of table. In the above example, simplifying assumptions are made that may be generalized for use with the techniques herein. For example, the foregoing describes an embodiment in which the header is only on the first page and omitted from each subsequent page containing data of the table. Other embodiments may vary the foregoing. For example, an embodiment may always include the header section on each page of the table so that each page of the table is in accordance with the FIG. 4 as described herein. As another variation, an embodiment may allow a user to specify what page or pages (if any) are to include the header section and thus be rendered as described in connection with FIG. 4. For those pages without a header section, such pages may be rendered as described above in connection with FIG. 5.

In the embodiment described above in connection with FIGS. 4 and 5, each page of the table includes a footer section. An embodiment in accordance with the techniques herein may vary this. For example, an embodiment may allow a user to specify what page or pages (if any) are to include the footer section. In pages in which the footer section 220e is omitted, it is straightforward to modify the EQUATIONS and processing described above. For example, assume that an embodiment allows a user to configure rendering a table where the user specifies the header section 220a is included in only the first page, and the footer section 220e is included in the second and subsequent pages but not included in the first page. In this case, EQUATION 1 may be modified to remove the height or size of D 220d and E 220e where EQUATION 1 is now modified to become EQUATION 1A below used to compute AH for the first page:

$$AH = G - (A + B + C + F)$$ Equation 1A

The example above in connection with FIGS. 4 and 5 describes an embodiment in which each row of the table includes a single line of text. More generally, an embodiment may provide for use of the techniques herein where each row of the table may include any number of lines of text. In such an embodiment, it is straightforward to modify EQUATIONS 2 and 4 to determine the number of rows that may be included in a page. For example, assume each row of the table has a uniform spacing or height, L, where for example, L=2 denotes 2 lines of text per row of the table. In such an embodiment, EQUATION 2 may be modified to become EQUATION 2A:

$$N = AH / (L * FSIZE)$$ Equation 2A

Wherein

N, AH and FSIZE are as described above; and

L is an integer denoting the number of lines of text rendered per row of the table.

As a variation, EQUATIONS 2 and 2A may be more generally expressed as in EQUATION 2B:

$$N = AH / H$$ Equation 2B

In a similar manner, EQUATION 4 may be modified as in EQUATION 4A below:

$$N2 = AH2 / (L * F\ SIZE)$$ Equation 4A

As a variation, EQUATIONS 4 and 4A may be more generally expressed as in EQUATION 4B:

$$N2 = AH2 / H$$ Equation 4B

Generally, an embodiment in accordance with the techniques herein may provide support for one or more configurable parameters to allow a user to control various aspects of table pagination, or more generally, values used in connection with controlling the rendering of the table. The parameters may be provided for a user to configure or specify any one or more of the following as discussed above:

what page or pages (if any) are to include the header section 220b;

what page or pages (if any) are to include the footer section 220e;

how many lines of text are included in each row of the table (e.g., default may be 1 line per row as discussed above in connection with FIGS. 4 and 5); and the font size and character set for each line of text displayed in the table.

Additionally, an embodiment in accordance with the techniques herein may provide support for one or more configurable parameters to allow a user to control the size of any of A, B, C, D, E, F, G and H as discussed above in connection with FIGS. 4 and 5.

In at least one embodiment, default values may be specified for each of the different sizes or heights of A, B, C, D, E, F, G and H as discussed above in connection with FIGS. 4 and 5, which may be overridden or reconfigured based on a subsequently specified user provided parameter value.

In at least one embodiment, support may be provided where a user specifies an image that may be inserted in one or more portions or sections of the page. For example, an embodiment may allow a user to provide an image, such as for a company logo, copyright watermark, and the like, which may be inserted in one or more sections denoted by 220a, 220b, 220c, 220d, 220e, or 220f in FIG. 4, if such section is included in a rendered page. In such an embodiment, the height of the particular section including the image may be determined based on the height inserted image.

Figure 6:
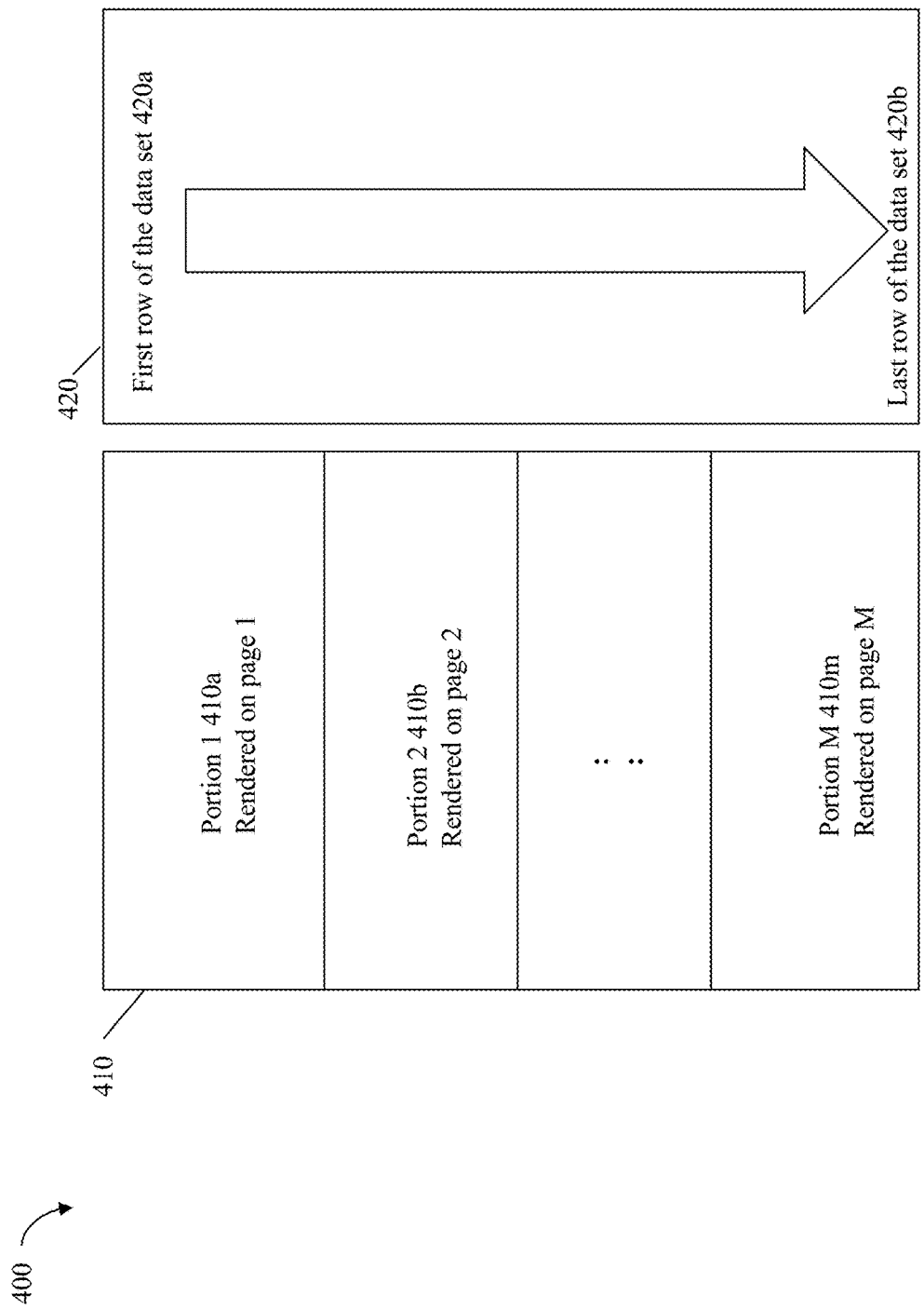
FIG. 6 is an example illustrating partitioning of a data in an embodiment in accordance with the techniques herein.

Referring to FIG. 6, shown is an example illustrating a data set 410 that may be partitioned into portions or buckets rendered on different pages of the table in an embodiment in accordance with the techniques herein. The example 400 includes the data set 410 that may be partitioned into M portions or buckets, 410a-m, M generally being an integer greater than 0. Based on the particular portions or sections and font sizes that may vary with each rendered page, the techniques herein may be used to determine a maximum amount of the data set 410 that may be included in the next page of the table.

For example, reference is made back to FIGS. 4 and 5 and the particular embodiment described above. In connection with FIG. 4 corresponding to a first rendered page of the table, the first 15 rows of the data set may be included on page 1. Thus, portion or bucket 1 410a of the data set rendered on page 1 may include 15 rows of the data. Assume that FIG. 5 corresponds to the layout in the second and each subsequent page of the table. In this case, portion or bucket 2 410b of the data set rendered on page 2 may include the next 18 rows of the data. The 18 rows 410b included on the page 2 may be the next sequentially and contiguous rows of the data set. In a similar manner, each subsequent page from 2 to page M may include the next 18 rows of the data set. Element 410m denotes the portion or bucket M of the data set rendered on the last page M of the table.

It should be noted that the last page M of the table may generally include any remaining rows of the data set up to the maximum number determined in accordance with EQUATIONS 3 and 4.

Consistent with discussion above, each next sequential page of the rendered table may include the next contiguous rows of the data set. For example, element 420 may denote the sequentially consecutive and contiguous rows of the data set from the first row 420a to the last row 420*b*. Row of the data set are processed for inclusion in a page of the table by traversal of the data set, in sequential order, from the first row 420*a* to the last row 420*b*. In this manner, portions or buckets 1 through M correspond to the sequential and contiguously ordered rows of the data set 410 rendered in the table having a format or layout per page as in connection with FIGS. 4 and 5.

Figure 7:
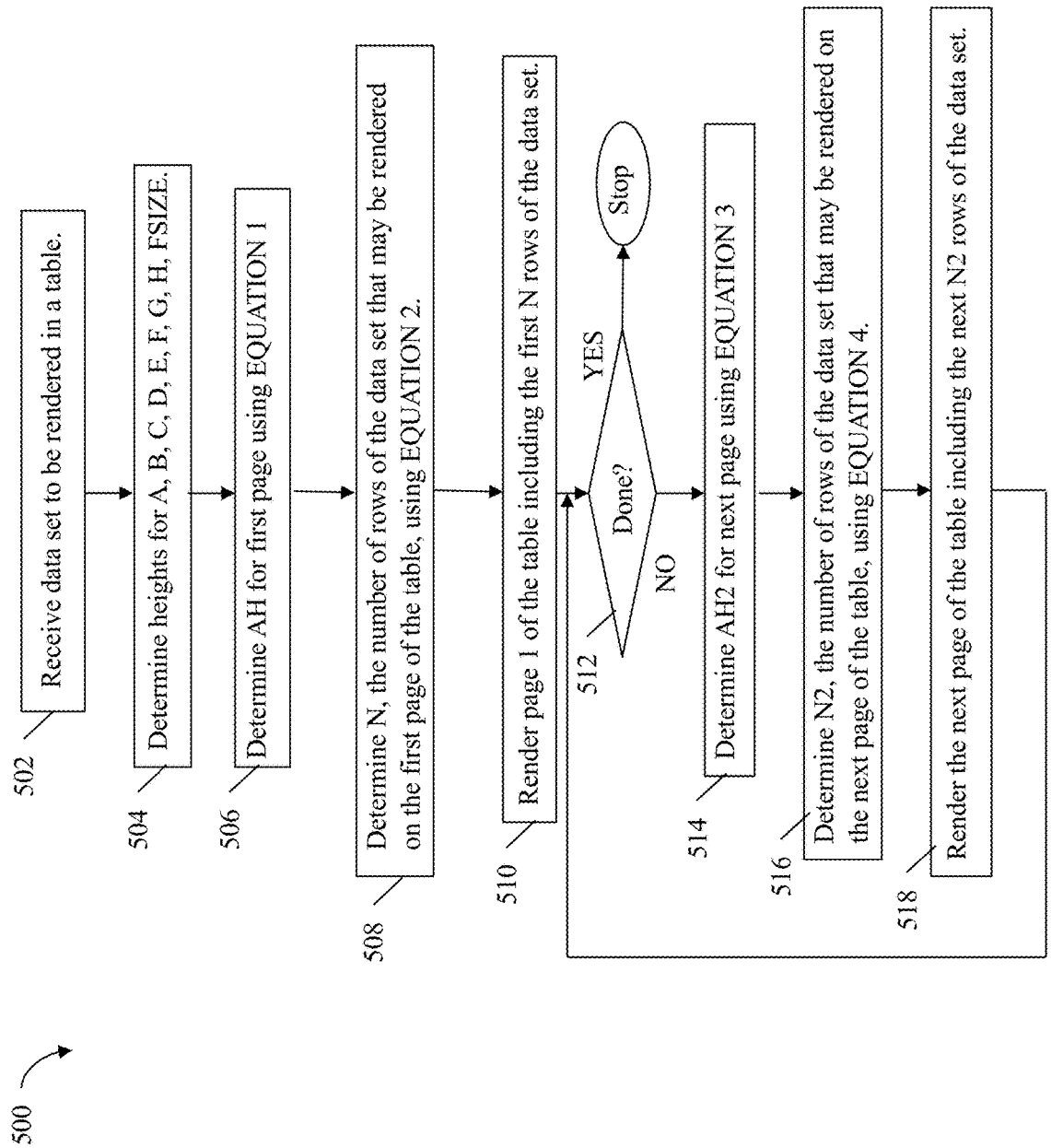
FIG. 7 is a flowchart of processing steps that may be performed in at least one embodiment in accordance with the techniques herein.

Referring to FIG. 7, shown is a flowchart 500 of processing steps that may be performed in an embodiment in accordance with the techniques herein. The flowchart 500 summarizes processing as described above such as in connection with the FIGS. 4 and 5.

At the step 502, a data set to be rendered in a table is received. The table may be stored in a document such as a file in accordance with a particular file format. From the step 502, control proceeds to the step 504. At the step 504, heights for A, B, C, D, E, F, G, H and FSIZE as described above are determined. From the step 504, control proceeds to the step 506. At the step 506, AH is determined for the first page using EQUATION 1. From the step 506, control proceeds to the step 508. At the step 508, N is determined where N is the number of rows of the data set rendered on the first page of the table. The step 508 may be performed based on the calculation for N determined using EQUATION 2, or more generally, such as expressed in EQUATION 2B.

From the step 508, control proceeds to the step 510. At the step 510, page 1 of the table may be rendered including the first N rows of the data set. From the step 510, control proceeds to the step 512. At the step 512, a determination is made as to whether processing of all rows of the data set to be rendered in the table is complete. If the step 512 evaluates to yes, processing steps. If the step 512 evaluates to no, control proceeds to the step 514. At the step 514, AH2 is determined for the next page of the table using EQUATION 3. From the step 514, control proceeds to the step 516. At the step 516, processing is performed to determine N2, the number of rows of the data rendered on the next page of the table. The step 516 may be performed based on the calculation for N2 determined using EQUATION 4, or more generally, such as expressed in EQUATION 4B. From the step 516, control proceeds to the step 518 to render the next page of the table including the next N2 rows of the data set. From the step 518, control proceeds to the step 512.

It should be noted that generally, a data set may not completely fill all possible rows of the last page of the table. Thus, each of the steps 508 and 516 may be characterized as determining a maximum number of rows that may be included in pages of the rendered table. If the page rendered is not a last page, then the maximum number of rows is rendered. If the page rendered is the last page, then the number of rows populated and thus rendered may be equal to or less than the maximum number depending on the remaining amount of rows in the data set.

The techniques herein may be performed using any suitable hardware and/or software. For example, the techniques herein may be performed by executing code which is stored on any one or more different forms of computer-readable media. Computer-readable media may include different forms of volatile (e.g., RAM) and non-volatile (e.g., ROM, flash memory, magnetic or optical disks, or tape) storage which may be removable or non-removable.

While the invention has been disclosed in connection with preferred embodiments shown and described in detail, their modifications and improvements thereon will become readily apparent to those skilled in the art. Accordingly, the spirit and scope of the present invention should be limited only by the following claims.

What is claimed is:

1. A computer-implemented method of processing a data set comprising:
    receiving, using a processor, the data set;
    partitioning, using a processor, the data set into a plurality of portions each including rows of data of the data set, wherein a different one of the plurality of portions is included in a different one of a plurality of pages of a table, wherein said partitioning includes:
        determining, using a processor, a first number of rows of the data set to include in a first page of the plurality of pages, wherein the first number of rows is determined in accordance with a first plurality of heights including a height of a header section, a height of a footer section, heights of a plurality of margins, a total height of each page of the table, and a height of each row of the table; and
        determining, using a processor, a second number of rows of the data set to include in a second page of the table subsequent to the first page of the table, wherein the second number of rows is determined in accordance with a second plurality of heights including at least some of the first plurality of heights; and
    rendering, using a processor, the plurality of pages of the table, wherein the second plurality of heights includes the height of the footer section, at least some of the heights of the plurality of margins, the total height of each page of the table, and the height of each row of the table, and wherein the second plurality of sizes does not include the height of the header section, and wherein said determining the first number of rows, N, includes:
    calculating, using a processor, an available height, AH, on the first page of the table for rendering a first portion of the data set as: AH=G−(A+B+C+D+E+F), wherein G is the total height of each page of the table, A is a height of a top margin from a top of the first page to the header section, B is the height of the header section, C is a height of a margin between a bottom of the header section and a first row of the table included on the first page, D is a height of a margin between a last row of the first page and the footer section, E is the height of the footer section and F is a height of a margin between the footer section and a bottom of the first page, and wherein the method further includes:
    receiving, using a processor, one or more user interface selections made using one or more user interface controls of a graphical user interface of an application, wherein the one or more user interface selections specify one or more values for one or more corresponding configurable parameters, wherein the one or more corresponding configurable parameters include at least one of A, B, C, D, E, F and G.

2. The method of claim 1, wherein the first number of rows, N, is determined in accordance with AH and the height of each row of the table.

3. A method of processing a data set comprising:
    receiving, using a processor, the data set;
    partitioning, using a processor, the data set into a plurality of portions each including rows of data of the data set, wherein a different one of the plurality of portions is included in a different one of a plurality of pages of a table, wherein said partitioning includes:
        determining, using a processor, a first number of rows of the data set to include in a first page of the plurality of pages, wherein the first number of rows is determined in accordance with a first plurality of heights including a height of a header section, a height of a footer section, heights of a plurality of margins, a total height of each page of the table, and a height of each row of the table; and determining, using a processor, a second number of rows of the data set to include in a second page of the table subsequent to the first page of the table, wherein the second number of rows is determined in accordance with a second plurality of heights including at least some of the first plurality of heights; and rendering, using a processor, the plurality of pages of the table, wherein the second plurality of heights includes the height of the footer section, at least some of the heights of the plurality of margins, the total height of each page of the table, and the height of each row of the table, and wherein the second plurality of sizes does not include the height of the header section, and wherein said determining the second number of rows, N2, includes:

calculating, using a processor, an available height, AH2, on the second page of the table for rendering a second portion of the data set as: AH2=G−(A+D+E+F), wherein G is the total height of each page of the table, A is a height of a top margin from a top of the second page to a first row of the table included on the second page, D is a height of a margin between a last row of the table included on the second page and the footer section, E is the height of the footer section and F is a height of a margin between the footer section and a bottom of the second page, and wherein the method further includes:

receiving, using a processor, one or more user interface selections made using one or more user interface controls of a graphical user interface of an application, wherein the one or more user interface selections specify one or more values for one or more corresponding configurable parameters, wherein the one or more corresponding configurable parameters include at least one of A, D, E, F and G.

4. The method of claim 3, wherein the second number of rows, N2, is determined in accordance with AH2 and the height of each row of the table.

5. The method of claim 4, wherein, when the table is rendered, the first page including the first number of rows is placed in the table prior to any other of the plurality of pages of the table.

6. The method of claim 5, wherein, when the table is rendered, the second page including the second number of rows is placed in the table immediately subsequent to the first page.

7. The method of claim 6, wherein each page of the plurality of pages appearing in the table subsequent to the second page when the table is rendered has a layout identical to the second page.

8. The method of claim 7, wherein each page of the plurality of pages that appears in the table subsequent to the second page when the table is rendered has a number of rows equal to the second number of rows.

9. The method of claim 1, wherein each height included in the first plurality of heights and the second plurality of heights is expressed as a number of points denoting a vertical measurement of a rendered character.

10. The method of claim 1, wherein the table is stored in a document in accordance with a specified file format used by a software application.

11. The method of claim 10, further comprising:
displaying the data set in the graphical user interface of the application; and
selecting, using the user interface, a control that generates a report including the data set rendered as the table in the specified file format.

12. The method of claim 11, wherein the application is a data storage system management application.

13. The method of claim 12, wherein the data set includes information about a plurality of entities in a data storage system.

14. The method of claim 13, wherein the plurality of entities includes at least one physical entity in the data storage system.

15. The method of claim 14, wherein the plurality of entities includes at least one logical entity in the data storage system.

16. A system comprising:
one or more processors; and
a memory comprising code stored thereon that, when executed, performs a method of processing a data set comprising:
receiving, using a processor, the data set;
partitioning, using a processor, the data set into a plurality of portions each including rows of data of the data set, wherein a different one of the plurality of portions is included in a different one of a plurality of pages of a table, wherein said partitioning includes:
determining, using a processor, a first number of rows of the data set to include in a first page of the plurality of pages, wherein the first number of rows is determined in accordance with a first plurality of heights including a height of a header section, a height of a footer section, heights of a plurality of margins, a total height of each page of the table, and a height of each row of the table; and
determining, using a processor, a second number of rows of the data set to include in a second page of the table subsequent to the first page of the table, wherein the second number of rows is determined in accordance with a second plurality of heights including at least some of the first plurality of heights; and
rendering, using a processor, the plurality of pages of the table, wherein the second plurality of heights includes the height of the footer section, at least some of the heights of the plurality of margins, the total height of each page of the table, and the height of each row of the table, and wherein the second plurality of sizes does not include the height of the header section, and wherein said determining the first number of rows, N, includes:
calculating, using a processor, an available height, AH, on the first page of the table for rendering a first portion of the data set as: AH=G−(A+B+C+D+E+F), wherein G is the total height of each page of the table, A is a height of a top margin from a top of the first page to the header section, B is the height of the header section, C is a height of a margin between a bottom of the header section and a first row of the table included on the first page, D is a height of a margin between a last row of the first page and the footer section, E is the height of the footer section and F is a height of a margin between the footer section and a bottom of the first page, and wherein the method further includes:
receiving, using a processor, one or more user interface selections made using one or more user interface controls of a graphical user interface of an application, wherein the one or more user interface selections specify one or more values for one or more corresponding configurable parameters, wherein the one or more corresponding configurable parameters include at least one of A, B, C, D, E, F and G.

17. A non-transitory computer readable medium comprising code stored thereon that, when executed, performs a method of processing a data set comprising:
receiving, using a processor, the data set;
partitioning, using a processor, the data set into a plurality of portions each including rows of data of the data set, wherein a different one of the plurality of portions is included in a different one of a plurality of pages of a table, wherein said partitioning includes:
determining, using a processor, a first number of rows of the data set to include in a first page of the plurality of pages, wherein the first number of rows is determined in accordance with a first plurality of heights including a height of a header section, a height of a footer section, heights of a plurality of margins, a total height of each page of the table, and a height of each row of the table; and
determining, using a processor, a second number of rows of the data set to include in a second page of the table subsequent to the first page of the table, wherein the second number of rows is determined in accordance with a second plurality of heights including at least some of the first plurality of heights; and
rendering, using a processor, the plurality of pages of the table, wherein the second plurality of heights includes the height of the footer section, at least some of the heights of the plurality of margins, the total height of each page of the table, and the height of each row of the table, and wherein the second plurality of sizes does not include the height of the header section, and wherein said determining the first number of rows, N, includes:
calculating, using a processor, an available height, AH, on the first page of the table for rendering a first portion of the data set as: $AH=G-(A+B+C+D+E+F)$, wherein G is the total height of each page of the table, A is a height of a top margin from a top of the first page to the header section, B is the height of the header section, C is a height of a margin between a bottom of the header section and a first row of the table included on the first page, D is a height of a margin between a last row of the first page and the footer section, E is the height of the footer section and F is a height of a margin between the footer section and a bottom of the first page, and wherein the method further includes:
receiving, using a processor, one or more user interface selections made using one or more user interface controls of a graphical user interface of an application, wherein the one or more user interface selections specify one or more values for one or more corresponding configurable parameters, wherein the one or more corresponding configurable parameters include at least one of A, B, C, D, E, F and G.

18. A non-transitory computer readable medium comprising code stored there that, when executed, performs a method of processing a data set comprising:
receiving, using a processor, the data set;
partitioning, using a processor, the data set into a plurality of portions each including rows of data of the data set, wherein a different one of the plurality of portions is included in a different one of a plurality of pages of a table, wherein said partitioning includes:
determining, using a processor, a first number of rows of the data set to include in a first page of the plurality of pages, wherein the first number of rows is determined in accordance with a first plurality of heights including a height of a header section, a height of a footer section, heights of a plurality of margins, a total height of each page of the table, and a height of each row of the table; and
determining, using a processor, a second number of rows of the data set to include in a second page of the table subsequent to the first page of the table, wherein the second number of rows is determined in accordance with a second plurality of heights including at least some of the first plurality of heights; and
rendering, using a processor, the plurality of pages of the table, wherein the second plurality of heights includes the height of the footer section, at least some of the heights of the plurality of margins, the total height of each page of the table, and the height of each row of the table, and wherein the second plurality of sizes does not include the height of the header section, and wherein said determining the second number of rows, N2, includes:
calculating, using a processor, an available height, AH2, on the second page of the table for rendering a second portion of the data set as: $AH2=G-(A+D+E+F)$, wherein G is the total height of each page of the table, A is a height of a top margin from a top of the second page to a first row of the table included on the second page, D is a height of a margin between a last row of the table included on the second page and the footer section, E is the height of the footer section and F is a height of a margin between the footer section and a bottom of the second page, and wherein the method further includes:
receiving, using a processor, one or more user interface selections made using one or more user interface controls of a graphical user interface of an application, wherein the one or more user interface selections specify one or more values for one or more corresponding configurable parameters, wherein the one or more corresponding configurable parameters include at least one of A, D, E, F and G.

19. A system comprising:
one or more processors; and
a memory comprising code stored thereon that, when executed, performs a method comprising:
receiving, using a processor, the data set;
partitioning, using a processor, the data set into a plurality of portions each including rows of data of the data set, wherein a different one of the plurality of portions is included in a different one of a plurality of pages of a table, wherein said partitioning includes:
determining, using a processor, a first number of rows of the data set to include in a first page of the plurality of pages, wherein the first number of rows is determined in accordance with a first plurality of heights including a height of a header section, a height of a footer section, heights of a plurality of margins, a total height of each page of the table, and a height of each row of the table; and
determining, using a processor, a second number of rows of the data set to include in a second page of the table subsequent to the first page of the table, wherein the second number of rows is determined in accordance with a second plurality of heights including at least some of the first plurality of heights; and rendering, using a processor, the plurality of pages of the table, wherein the second plurality of heights includes the height of the footer section, at least some of the heights of the plurality of margins, the total height of each page of the table, and the height of each row of the table, and wherein the second plurality of sizes does not include the height of the header section, and wherein said determining the second number of rows, N2, includes:

calculating, using a processor, an available height, AH2, on the second page of the table for rendering a second portion of the data set as: $AH2 = G - (A + D + E + F)$, wherein G is the total height of each page of the table, A is a height of a top margin from a top of the second page to a first row of the table included on the second page, D is a height of a margin between a last row of the table included on the second page and the footer section, E is the height of the footer section and F is a height of a margin between the footer section and a bottom of the second page, and wherein the method further includes:

receiving, using a processor, one or more user interface selections made using one or more user interface controls of a graphical user interface of an application, wherein the one or more user interface selections specify one or more values for one or more corresponding configurable parameters, wherein the one or more corresponding configurable parameters include at least one of A, D, E, F and G.

\* \* \* \* \*